United States Patent [19]
De Filippis

[11] 3,943,532
[45] Mar. 9, 1976

[54] FLASH ATTACHMENT FOR SELF-DEVELOPING COLLAPSIBLE CAMERAS

[75] Inventor: John De Filippis, South Amboy, N.J.

[73] Assignee: International Telephone and Telegraph Corporation, Nutley, N.J.

[22] Filed: June 25, 1974

[21] Appl. No.: 482,928

[52] U.S. Cl. ............... 354/126; 354/145; 354/295; 240/1.3
[51] Int. Cl.² ..................................... G03B 15/05
[58] Field of Search ............ 354/126, 83, 129, 139, 354/145, 149, 141, 295; 240/1.3

[56] References Cited
UNITED STATES PATENTS

| | | |
|---|---|---|
| 3,458,696 | 7/1969 | Kapteyn et al...................... 354/126 |
| 3,559,549 | 2/1971 | Ackerman .......................... 354/145 |
| 3,809,878 | 5/1974 | Brandt ............................ 354/141 X |

Primary Examiner—Robert P. Greiner
Attorney, Agent, or Firm—John T. O'Halloran; Menotti J. Lombardi, Jr.; Richard A. Menelly

[57] ABSTRACT

An improved flash lamp attachment for self-developing collapsible cameras provides high pressure xenon flash illumination by means of removable and separate flash lamp and power-pack assemblies. The powerpack circuitry utilizes part of the voltage provided within the camera film battery pack along with voltage supplied by an auxiliary battery disposably contained within the power-pack assembly.

2 Claims, 6 Drawing Figures

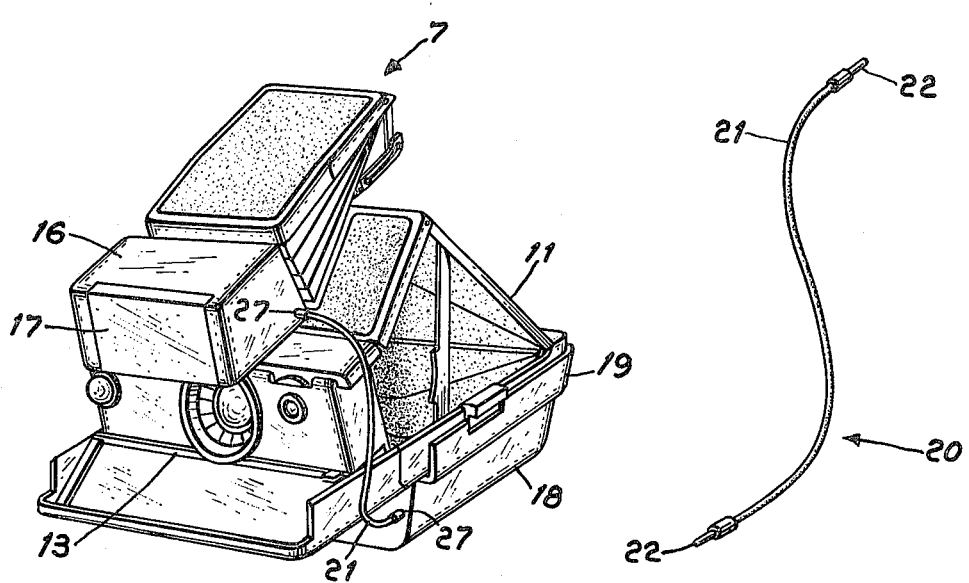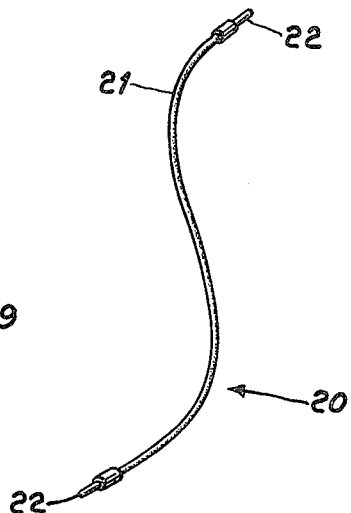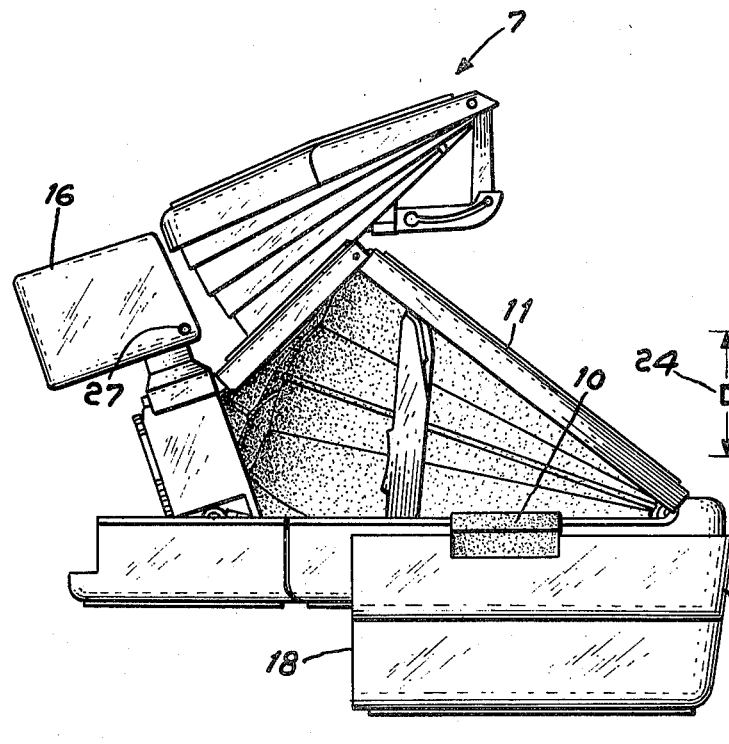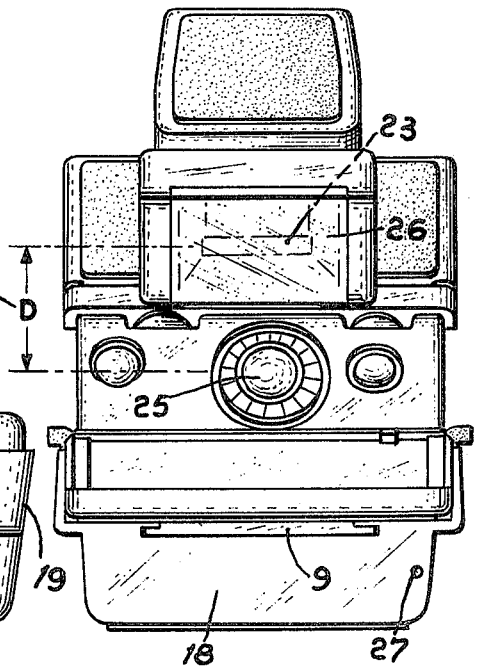

FLASH ATTACHMENT FOR SELF-DEVELOPING COLLAPSIBLE CAMERAS

BACKGROUND OF THE INVENTION

The advent of self-developing collapsible cameras has introduced a new dimension in rapid on-the-scene film developing.

The new type Polaroid SX-70 camera develops brilliantly colored photographs external to the camera in a process that compares, for example, to time lapse photography in its ability to rapidly and somewhat mysteriously bring color photographs to life.

The SX-70 camera utilizes a new film composition and chemistry different from ordinary self-developing cameras. The use of a special film therefore allows the film package to contain a battery within the film pack. This battery provides power both for the camera operation mechanism and for energizing flash lamps when flash lamps are necessary.

So far the new SX-70 camera has been mainly limited to an explosion type flash bulb of the type using consumable metal powders heated to irridescense in an oxygen rich environment. Several of these flash bulbs have been combined in a series to form a flash pack or bar in order to provide a sufficient number of flashes roughly equivalent to the useful life of the battery contained within the film package. One example of such a flash bar device is disclosed within U.S. Pat. No. 3,748,985 assigned to the Polaroid Corporation.

The use of a number of explosive flash bulbs has presented a problem in view of the very nature of its expendibility since the flash bulbs have to be disposed of when used.

The Polaroid SX-70 type camera by the use of unique self-developing films avoids a lot of the messy paper containers and chemicals necessarily involved in earlier type self-developing films. The new film process presents an ecological advancement since less material remains to be discarded or disposed of than by methods previously employed. The use of disposable flash bulbs, consisting mainly of glass and plastic, therefore presents a problem of disposal inconsistent with the ecological advantages presented with the advent of the SX-70 camera.

The use of a large number of disposable flash bulbs within a package results in an uneven distribution of light, and in cases where the subject is mainly illuminated by the flash, for example, in low ambient light area, "hot spot" regions of intense illumination can occur due to the particular narrow reflector geometry. Another limitation which sometimes occurs when the lighting ambient level is quite low, and when the principle source of illumination is mainly provided by the flash bulb, is the possibility of a slightly blurred photographic image when the subject being photographed is in motion.

All of the above disadvantages can be overcome by the use of electronic flash lamps of the type employing a xenon arc tube. The tube has very long operating life and presents no immediate ecological disadvantages. The optimum reflector geometry provides a uniform light distribution pattern for eliminating "hot spots" and, due to its very short and intense flash duration, is able to take action pictures in low lighting ambients without blurring. Heretofore, electronic flash lamps have not generally been utilized for self-developing compact type collapsible cameras mainly because the flash assembly apparatus and related electronic circuitry was not compatible with the camera's compact design features. The electronic flash attachments of the prior art were very effective for providing sufficiently bright and concentrated light for photographic requirements, but required auxiliary power-packs that could not be conveniently and readily removed from the camera prior to collapsing. The collapsible feature of the camera afforded easy storage and handling facility which was not in accordance with the removal of auxiliary and in some cases, bulky electronic flash gear.

The purpose of this invention is therefore to provide an improved flash attachment readily and conveniently removable from collapsible self-developing cameras. The attachment multi-functionally utilizes part of the film power-pack voltage in cooperation with an auxiliary battery voltage to provide thousands of high intensity flashes of extremely short pulse duration.

SUMMARY OF THE INVENTION

A novel electronic circuit has been developed for providing xenon lamp emission with electrically determined time synchronization between camera shutter opening and peak light intensity. Such a unit is described within copending application Ser. No. 453,666, assigned to the assignee of the instant invention. The improved electronic circuit described within the aforementioned application in combination with the multi-functional mounting and design features of the instant invention therefore provide an electronic flash unit suitable for new, compact, self-developing and collapsible cameras and therefore provides all the aforementioned benefits of the electronic flash over the explosive type flash units of the prior art.

According to the broad aspects of the present invention there is provided an improved flash lamp attachment comprising a xenon arc tube and reflector assembly, and a power-pack unit both being readily removable from the camera. The power-pack provides multi-functional power utilization in cooperation with the self-contained battery provided separately with each film package. The biasing voltage for the electronic charging and synchronizing circuit contained within the power-pack unit is supplied by the battery contained within the disposable film pack, and the power required for igniting the xenon flash lamp is provided by a separate disposable battery contained within the power unit.

BRIEF DESCRIPTION OF THE DRAWINGS

FIG. 2A is a front perspective view of the collapsible camera with the inventive flash attachment connected to the camera in an operative position;

FIG. 2B is a perspective view of the electrical connecting member apart from the flash attachment;

FIG. 2C is a front view of the collapsible camera with the inventive flash attachment connected to the camera;

FIG. 4 is a side view of the camera and flash attachment with the camera in an open and operative position.

DESCRIPTION OF THE PREFERRED EMBODIMENTS

Figure 1:
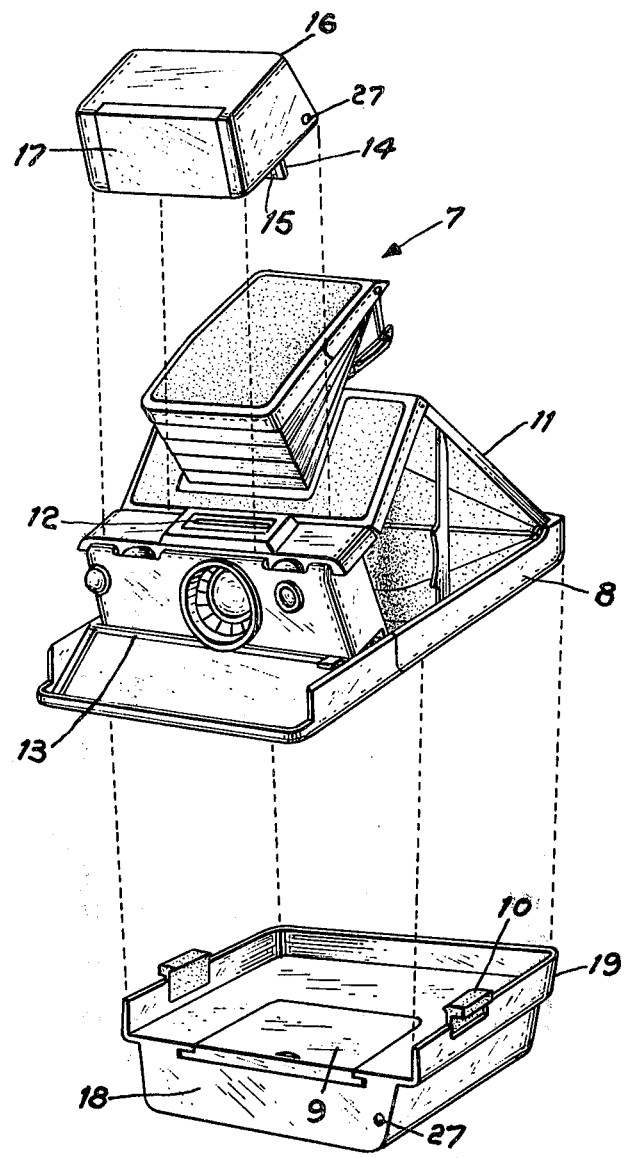
FIG. 1 is an exploded front view of the inventive flash attachment and the collapsible camera.
Figure 3:
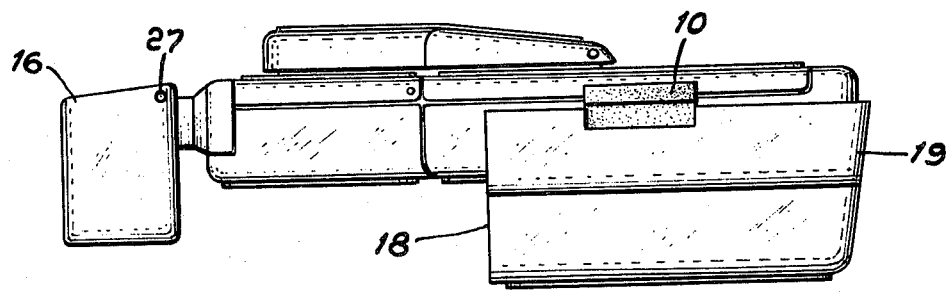
FIG. 3 is a side view of the collapsible camera in its compact collapsed state with the inventive flash attachment connected to the camera.

FIG. 1 shows a Polaroid SX-70 camera 11 in its open position showing an insert slot 12 for receiving the flash electrical contact member 14 and an exit slot 13 where the film passes from the camera after the picture has been taken. A film and battery unit are contained directly behind the film exit slot 13 and is not shown in the drawing. The flash lamp and reflector unit 16 shown in exploded position relative to its location on the camera has a transparent window 17 on its forward face so that the light generated within the unit is projected in a forward direction. A number of contacts 15 are positioned on the electrical contact member 14 for electrical coupling between the unit 16 and the camera 11 by means of insert slot 12. The power-pack 18 shown in exploded view relative to its position on the camera 11 has an operating access member 9 on its top surface for providing ready access to the electronic circuitry and the battery contained within the power-pack. The ridge-like extension 19 on the top surface of the power-pack 18 extends along the top, sides and back surface. The top front surface, however, is open so that power-pack can be slid onto the camera 11. Mounting the power-pack 18 to the camera 11 is accomplished by bringing the power-pack open portion of the extending members 19 in contact with the bottom part of the camera 8 and sliding the power-pack forward while the extending members 19 engage the bottom part of the camera 8 until the extending members completely enclose the bottom part of the camera 8. Rail members 10 attached to the top extending members 19 meet and engage between the power-pack and camera and provide a firm attachment between the power-pack and the camera for preventing the power-pack from inadvertently becoming loose and sliding away from the camera.

FIG. 2A shows the collapsible camera 11 with both the flash lamp and reflector unit 16 attached and the power-pack 18 connected. Electrical connection is provided between the power-pack 18 and the flash lamp and reflector unit 16 by means of flexible electrical connecting member 20 and electrical insertion jacks 27 provided on both the flash lamp and reflector unit 16 and power-pack 18. FIG. 2B shows one embodiment of an electrical connecting member having end contact members 22 in the form of electrical insert plugs at both ends. In order to prevent electrical connection between the camera and the connecting member 20 an external insulating coating 21 is generally present on the outer surface of the electrical connecting member 20.

In the operating phase of the flash attachment and camera combination good synchronization between the lens shutter opening 25 in the flash produced by the xenon flash lamp 23 shown at FIG. 2C is accomplished by the circuit contained within power-pack 18 which circuit is described in detail in the aforementioned patent application incorporated by reference within this application. A highly polished reflector unit 26 is provided behind and in axial alignment with xenon flash lamp 23 for projecting the light in a flood light illumination pattern forward of the camera lens 25.

The distance D depicted in FIG. 2C represents the separation distance existing between the flash lamp 23 and the camera lens 25. This distance has been particularly chosen so that the flash attachment and camera combination will produce the best photographic images heretofore obtainable for this particular camera. Most camera users gauge the subject's distance by means of the appearance of the subject within the camera view finder 7 shown in detail in FIG. 4. However, it quite often occurs when the light ambient is low and the main source of illumination is provided by some sort of a flash lamp attached to the camera that the distance as gauged, for example, by the image of the photographic subject in the view finder 7 is not the optimum distance in view of the problems that quite often occur in colored film photography under intense artificial illumination.

One of the more serious problems is the red appearance of the subject's eyes occurring in the developed photograph when intense artificial illumination is used as the principle source of light. This reddish occurrence, defined below in greater detail, is directly related to the separation distance D which exists between the flash lamp and the camera lens. The separation distance D therefore of the inventive flash attachment in combination with the new SX-70 collapsible camera was chosen to provide high quality color photographs particularly when the ambient light level is low.

The reflector geometry for the flash lamp and reflector housing is particularly designed to give a flood lamp type illumination to the subject as seen through the view finder in order to substantially eliminate the "hot spot" problem which may occur with the very narrow reflectors used with the flash bar attachment of the prior art. Uniformly illuminated color photographs have been achieved by means of the broad parabolic reflector design and the confocal tubular geometry of the xenon arc tube light source. The linear relationship existing between the tubular geometry of the lamp and the wide parabolic geometry of the reflector make the resulting reflective flash pattern appear to occur from a more linear source than from a point source relationship that exists with the smaller flash bulb and reflector of the prior art.

OPERATION OF THE PREFERRED EMBODIMENT

In order to evaluate the improved electronic flash and camera combination the following tests were performed.

A self-developing Polaroid SX-70 camera containing the inventive flash attachment and utilizing the synchronization circuit disclosed within the aforementioned copending application Ser. No. 453,666 was evaluated in the following manner.

A young child particularly susceptible to "red eye" characteristics when using the self-developing color film was chosen as a photographic subject. Red eye for the purpose of this disclosure is defined to be the reddish appearance of a photographic subject's eye on film caused by light reflected back to the lens from the CHOROID layer in the retina. The "red eye" problem is believed to be related to the close proximity of the flash to the lens axis. "Red eye" generally occurs when the subject is at distance roughly equal to 30 times the separation distance of the flash source and the lens axis. Therefore the closer the flash source is located relative to the lens axis, the shorter the subject distance to the camera before "red eye" becomes noticeably pronounced.

Using the aforementioned young subject for this experiment we found that the advent of "red eye" occurred at a greater distance with our electronic flash than with the conventional flash bar type attachment. Since the flash to lens separation is greater for the inventive flash than with the flash bar of the prior art, this result appears consistent with the prevalent theory as to the choroid reflection.

We also discovered for equivalent flash to lens separation distance with both the inventive electronic flash and the flash bar of the prior art (since the flash "travels" on prior art flash bar devices due to the linear flash arrangement along the flash bar axis) that red eye was less pronounced with the inventive flash combination than with the prior art flash bar. This is possibly due to the fact that the shorter pulse of greater light intensity occurring with the inventive electronic flash causes the subject's pupil to dilate to a greater degree than with the longer flash time that occurs with the explosive flash bulbs used in the flash bar of the prior art. The greater the dilation of the pupil the lesser the amount of light reflected directly from the choroid layer and the lesser the amount of red eye.

What is claimed is:

1. In an improved electronic flash unit for a collapsible camera containing a self-developing film pack, said unit of the type including a flash lamp positioned above the camera lens and a power pack below the camera lens, wherein the improvement comprises:
   means for mounting the power pack flush with the bottom of the camera, said mounting means being integrally formed with the power pack for providing connection with said camera when said camera is in both a collapsed inoperative position and an open operative position, said means including engaging members extending from the top of the power pack and engaging the bottom sides of the camera to provide press fit retention between the power pack and the camera.

2. The improved electronic flash unit of claim 1 wherein said flash lamp is removably connected with said camera by means of a bayonet-type electrical connection.

* * * * *